Patented Mar. 27, 1934

1,952,976

UNITED STATES PATENT OFFICE 1,952,976

CYANIDING AURIFEROUS MATERIALS

Charles William Dowsett, Parktown, Johannesburg, Transvaal, and Wesley Ernest John, Johannesburg, Transvaal, Union of South Africa; said Dowsett assignor to said John No Drawing. Application June 2, 1932, Serial No. 615,066. In Union of South Africa July 10, 1931

4 Claims. (Cl. 75—185)

The present invention relates to the cyanide treatment of ores and other materials containing gold. An object of the invention is to accelerate and improve the dissolution of the gold. A specific object of the invention is to accelerate and improve the attack of the cyanide on the less readily soluble auriferous constituents of ores, such as the constituents of recognized refractory ores, or in the case of ores such as those of the Witwatersrand which are on the whole free milling, those auriferous particles which for various reasons are specially resistant to cyanide and so apt to raise the residue value.

According to the invention mercury in solution is caused to be present in the cyanide solution during the dissolution of the gold, in the proportion of one part by weight of mercury in at least fifty-five thousand parts by weight of the cyanide solution. A materially greater concentration of mercury defeats the object of the invention. On the other hand, much greater dilutions are possible in practice, satisfactory results having been attained with a proportion of one in 400,000. The weaker the cyanide solution the less mercury there should be present; and for the usual working solutions having a cyanide concentration of from 0.02 to 0.1 per cent the best results have so far been attained with a proportion of about one to from 100,000 to 200,000.

The mercury-containing cyanide solution is conveniently prepared by adding to the cyanide solution a mercury compound which is soluble in such solution such as cyanide of mercury or oxide of mercury.

In some cases the solution has been prepared by the addition of mercuric oxycyanide, and this has shown some advantage. It is however, probable that the mercuric oxycyanide is always formed when the mercury is present according to this invention and plays an important part in aiding the dissolution of the gold. Mercuric oxycyanide is definitely formed when lime is present; so that the lime which is added to working cyanide solutions for other purposes, is beneficial to the invention.

The solution may also be prepared by bringing the mercury into contact with a cyanide solution and controlling, by length of time of contact or by dilution, the amount of mercury finally present in the solution.

It has been found that by subjecting the particles of the ore to movement, the speed and/or completeness of the extraction is improved. The mercury may accordingly be introduced with the cyanide solution in the grinding circuit or in the Pachuca or other agitation vessel; whilst in the case of concentrates it has been found advantageous to carry out the treatment in a revolving drum.

The mercury performs the same function as the lead commonly added to cyanide solutions, in preventing the deleterious action of sulphides present in the ore and in assisting the precipitation of the gold on zinc. The invention accordingly enables the quantity of lead to be reduced proportionately with the amount of mercury present.

As an explanation of the useful effects produced by the invention, it is suggested that the mercury combines with the hydroxyl ions present in the dilute cyanide solution, ultimately forming mercuric oxycyanide; and that by splitting up, the mercuric oxycyanide provides the nascent oxygen necessary for completing the chemical equation by which the solution of gold in an alkali cyanide is usually represented. It is further suggested that the reason for non-success when a high proportion of mercury is present is that the mercury released by the splitting up of the mercuric oxycyanide is not readily re-dissolved but is precipitated upon the gold in such quantity as to hinder the attack of the cyanide solution upon the gold.

When, after the dissolution step, the gold is precipitated from the enriched solution onto zinc, the mercury precipitates with it. It may be recovered, if desired, by heating the gold slimes, after their treatment with acid, so as to volatilize the mercury; from which a further supply of, for instance, mercury cyanide or oxide may be prepared.

We claim:

1. The process of cyaniding auriferous material which consists in dissolving the gold by means of cyanide solution containing mercury in solution in amount not exceeding one part by weight in fifty-five thousand parts by weight of solution.

2. The process of cyaniding auriferous material, which consists in dissolving the gold by means of cyanide solution containing mercury in solution in the proportion of one part by weight of mercury in from one hundred thousand to two hundred thousand parts by weight of cyanide solution.

3. The process of cyaniding auriferous material which consists in adding to a cyanide solution a mercury compound soluble in such solution in such amount that the proportion of mercury does not exceed one part by weight in fifty-five thousand parts by weight of the cyanide solution, and treating the material with the resulting solution to dissolve the gold.

4. The process of cyaniding auriferous material which consists in adding to a cyanide solution a mercury compound soluble in such solution in such amount that the proportion of mercury is one part by weight of from one hundred thousand to two hundred thousand parts by weight of the cyanide solution, and treating the material with the resulting solution to dissolve the gold.

CHARLES WILLIAM DOWSETT.
WESLEY ERNEST JOHN.